US009060383B2

(12) United States Patent
Bonneville et al.

(10) Patent No.: US 9,060,383 B2
(45) Date of Patent: Jun. 16, 2015

(54) METHOD AND A DEVICE FOR DECIDING IF THE OPERATING MODE OF A TELECOMMUNICATION DEVICE HAS TO BE SWITCHED IN A DIFFERENT OPERATING MODE

(75) Inventors: Herve Bonneville, Rennes Cedex (FR); Loic Brunel, Rennes Cedex (FR); Damien Castelain, Rennes Cedex (FR); Nicolas Gresset, Rennes Cedex (FR); David Mottier, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 861 days.

(21) Appl. No.: 12/997,399

(22) PCT Filed: Jun. 9, 2009

(86) PCT No.: PCT/EP2009/057121
§ 371 (c)(1),
(2), (4) Date: Mar. 9, 2011

(87) PCT Pub. No.: WO2009/150158
PCT Pub. Date: Dec. 17, 2009

(65) Prior Publication Data
US 2011/0151921 A1 Jun. 23, 2011

(30) Foreign Application Priority Data
Jun. 11, 2008 (EP) .................................... 08158037

(51) Int. Cl.
*H04Q 7/20* (2006.01)
*H04W 88/10* (2009.01)
*H04W 16/32* (2009.01)
*H04W 84/04* (2009.01)

(52) U.S. Cl.
CPC .............. *H04W 88/10* (2013.01); *H04W 16/32* (2013.01); *H04W 84/045* (2013.01)

(58) Field of Classification Search
USPC ........................ 455/438, 439, 443, 13.1, 11.1
See application file for complete search history.

(56) References Cited

U.S. PATENT DOCUMENTS

| 8,116,748 B2* | 2/2012 | Aaron ......................... 455/414.2 |
| 2007/0242647 A1* | 10/2007 | Bennett ........................ 370/338 |
| 2011/0244892 A1* | 10/2011 | MacManus et al. .......... 455/457 |

OTHER PUBLICATIONS

International Search Report issued Aug. 24, 2009 in PCT/EP09/57121 filed Jun. 9, 2009.
Russell, David: "New Microcell Technology Sets Cellular Carriers Free", Telephony, vol. 224, No. 9, pp. 40, 42, 46, XP000568185, (Mar. 1, 1993).

* cited by examiner

*Primary Examiner* — Charles Appiah
*Assistant Examiner* — Randy Peaches
(74) *Attorney, Agent, or Firm* — Oblon, McClelland, Maier & Neustadt, L.L.P.

(57) ABSTRACT

A method for deciding if a telecommunication device has to be switched in an operating mode which is different from the operating mode in which the telecommunication is operating. In an operating mode, the telecommunication device relays signals transferred between a terminal and an access node which handles the terminal. In another operating mode, the telecommunication device handles the terminal. The method includes: determining, from obtained information, if a predetermined event occurs, and if the predetermined event occurs, deciding that a handover of the terminal has to be conducted between the access node and the telecommunication device, and deciding that the telecommunication device has to switch in an operating mode which is different from the operating mode in which the telecommunication is operating.

19 Claims, 5 Drawing Sheets

METHOD AND A DEVICE FOR DECIDING IF THE OPERATING MODE OF A TELECOMMUNICATION DEVICE HAS TO BE SWITCHED IN A DIFFERENT OPERATING MODE

The present invention relates generally to a method and a device for deciding if the operating mode of a telecommunication device has to be switched in a different operating mode.

Today, we can observe a sharp increase in the deployment of wireless networks.

Local area networks like for example WIFI wireless networks are widely used today.

In urban regions, the coverage areas of the access nodes of these local area networks overlap each other.

That overlapping generates interferences in each of the wireless networks and reduces the performances of these wireless networks.

Wireless cellular telecommunication networks evolve a lot. Some years ago, an access node of the wireless cellular telecommunication network was managing a cell having a radius of several dozen kilometers.

Today, wireless cellular telecommunication networks are composed of these cells, named macro cells, of micro cells having a radius of several hundreds meters and of femto-cells having a radius of several dozen meters.

These different types of cells overlap each other.

In a urban environment a huge number of femto-cells are comprised inside a macro-cell. Such situation has the advantage of unloading the macro-cell and reducing the dead zones of the macro-cell but may generate interferences between overlapping femto-cells as between the femto-cells and the macro-cell.

In classical wireless cellular telecommunication networks, when a terminal is moving through different cells, a handover is executed between the access nodes which manage the cells the terminal goes through.

As the coverage area of the femto-cells is small, a huge number of handovers may need to be executed for a mobile terminal, which may induce a large overhead impact from the infrastructure point of view.

If the access nodes managing femto-cells are allowed to handle terminals, a moving terminal can potentially handover to an access node for a small time scale, leading to a drastic increase of the signalling load.

Furthermore, the interference level produced by the transmission of signals by a lot of active access nodes in a limited area will also degrade the link-level performance and may reduce the coverage.

The present invention aims at improving the operation of wireless telecommunication networks when the coverage areas of access nodes overlap each other or aims at avoiding that an important signalling occurs in the wireless telecommunication networks.

To that end, the present invention concerns a method for deciding if a telecommunication device has to be switched in an operating mode which is different from the operating mode in which the telecommunication is operating, the telecommunication device transferring radio signals to a terminal of a wireless telecommunication network, characterised in that in an operating mode, the telecommunication device relays signals transferred between the terminal and an access node handling the terminal and in another operating mode, the telecommunication device handles the terminal, and the method comprises the steps of:

- determining, from obtained information, if a predetermined event occurs and if the predetermined event occurs:
- deciding that a handover of the terminal has to be conducted between the access node and the telecommunication device,
- deciding that the telecommunication device has to switch in an operating mode which is different from the operating mode in which the telecommunication is operating.

The present invention also concerns a management entity which decides if a telecommunication device has to be switched in an operating mode which is different from the operating mode in which the telecommunication is operating, the telecommunication device transferring radio signals to a terminal of a wireless telecommunication network, characterised in that in an operating mode, the telecommunication device relays signals transferred between the terminal and an access node, the access node handling the terminal and in another operating mode, the telecommunication device handles the terminal, the management entity comprises:

- means for determining from obtained information if a predetermined event occurs,
- means for deciding that a handover of the terminal has to be conducted between the access node and the telecommunication device,
- means for deciding that the telecommunication device has to switch in an operating mode which is different from the operating mode in which the telecommunication is operating.

Thus, by enabling a telecommunication device to switch between a relay operation mode and an terminal handling operation mode, it is possible to reduce the interferences between neighbouring coverage areas.

When the telecommunication device is in the relay operation mode, the telecommunication device may solve the problem of dead zones by relaying the signals transferred by an access node.

Furthermore, when the telecommunication device is in the relay operation mode for a terminal, it does not handle the terminal, avoiding then possible handover and extra signalling on the network side.

By switching a telecommunication device to the relay operation mode among plural telecommunication devices operating in an handling mode, interferences are reduced. As the switched telecommunication device executes an handover prior to the switch, the terminal previously handled by the switched mode telecommunication device is still handled by a telecommunication device, which guarantees service continuity.

The coverage area of the switched telecommunication device and the coverage area of the telecommunication device which handles the terminal forms then a single coverage area of the telecommunication device which handles the terminal as the switched telecommunication device is no more considered as an access node.

The single coverage area size is increased and interferences are reduced.

According to a particular feature, the operating mode in which the telecommunication is operating is the operating mode in which the telecommunication device relays signals transferred between the terminal and the access node.

Thus, by switching from relay operation mode to an operation mode in which the telecommunication device handles the terminal, the load of the access node is reduced.

According to a particular feature, the operating mode in which the telecommunication is operating is the operating mode in which the telecommunication device handles the terminal.

Thus, the number of telecommunication devices which are in an operation mode in which the telecommunication device handles the terminal can be controlled.

According to a particular feature, the management entity:
obtains other information,
decides if another telecommunication device has to switch in the operation mode in which the telecommunication device relays signals transferred between the terminal and the access node according to the other information.

Thus, the telecommunication devices which are in the operation mode in which the telecommunication devices relay signals transferred between the terminal and the access node are selected according to environment information.

According to a particular feature, the management entity decides that the telecommunication device has to switch in a different operating mode in which the telecommunication device stops to transfer signals to the terminal.

Thus, the amount of transferred radio signals is reduced and interferences are limited.

According to a particular feature, the obtained information used for determining if the predetermined event occurs is the interference level measured by the telecommunication device and/or is a measurement on the signals transferred by the terminal and/or is the location of the telecommunication device and/or is the location of the terminal and/or is the available resource of the telecommunication in one or each operating mode and/or is measurement on the signals received by the terminal and/or is an information linking the terminal and the telecommunication device and/or is a time duration.

When information is the interference level, the present invention can detect cases wherein telecommunication devices interfere each other or when the signals transferred by the access node are interfered. The management entity can then decide the operation mode of the telecommunication device according to that parameter.

When information is measurement on the signals transferred by the terminal and received by the telecommunication device, the management entity can evaluate the communication link conditions between the telecommunication device and the terminal, evaluate the distance between the telecommunication device and the terminal. The management entity can then decide the operation mode of the telecommunication device according to these parameters.

When information is the location of the telecommunication device, the management entity can determine if a switch of the telecommunication device may improve the wireless telecommunication network characteristics.

When information is the location of the terminal, the management entity can determine if a switch of the telecommunication device may improve the communication link with the terminal.

When information is the available resource of the telecommunication device in one or each operating mode, the management entity can efficiently manage the resources allocated in one or each operating mode and determine if a switch of the telecommunication device is possible.

For example, if the holder of the telecommunication device defines an amount of resources which can be used for relaying and/or handling terminals, that amount is taken into account by the management entity.

When information is measurement on the signals received by the terminal, the management entity can evaluate the communication link conditions between the telecommunication device and the terminal. The management entity can then decide the operation mode of the telecommunication device according to that parameter.

When information is an information linking the terminal and the telecommunication device, for example a right for the terminal to be handled by the telecommunication device, the management entity can control which terminal can be handled by the telecommunication device.

When information is a time duration, for example the time duration while the telecommunication device relays signals, the management entity may determine that the terminal is not moving and in that it is favourable to switch the telecommunication device in the operation mode in which the telecommunication device handles the terminal as far as the probability is low that another handover may be needed.

According to a particular feature, the management entity is included in the access node or in the or each telecommunication device or is not included in the access node nor in the or each telecommunication device.

According to a particular feature, wireless telecommunication network is a wireless cellular telecommunication network.

According to a particular feature, prior to the decision that the handover of the terminal has to be conducted from the access node which handles the mobile terminal to the telecommunication device, the management entity obtains an information from the telecommunication device indicating if the telecommunication device can handle the terminal.

Thus, the handover is executed when good conditions exist.

According to a particular feature, the method comprises further step of deciding, according to previous switches of operating modes that the telecommunication device has to switch in the operating mode in which the telecommunication device relays signals transferred between the terminal and the access node.

Thus, when the telecommunication device is located in a dead zone, it still contributes to reduce that dead zone once a handover is executed.

According to a particular feature, the decision, according to previous switches of operating modes is executed by the management entity or by the telecommunication device.

According to still another aspect, the present invention concerns a method for switching a telecommunication device in an operating mode which is different from the operating mode in which the telecommunication is operating, the telecommunication device transferring radio signals to a terminal of a wireless telecommunication network, characterised in that in an operating mode, the telecommunication device relays signals transferred between the terminal and an access node, the access node handling the terminal and in another operating mode, the telecommunication device handles the terminal, and in that the method comprises the steps executed by the telecommunication device of:
transferring information representative of measurements to a management entity,
receiving a message representative of a request for executing a handover of the terminal between the access node and the telecommunication device,
executing the handover,
switching in an operating mode which is different from the operating mode in which the telecommunication is operating.

The present invention also concerns a telecommunication device which transfers radio signals to a terminal of a wireless telecommunication network, the telecommunication device being able to operate in two operation modes, characterised in that in an operating mode, the telecommunication device relays signals transferred between the terminal and an access node, the access node handling the terminal and in another operating mode, the telecommunication device handles the terminal, and in that the telecommunication device comprises:

means for transferring information representative of measurements to a management entity, means for receiving a message representative of a request for executing a handover of the terminal between the access node and the telecommunication device, means for executing the handover, means for switching in an operating mode which is different from the operating mode in which the telecommunication is operating.

Thus, by enabling a telecommunication device to switch between a relay function and an access node function, it is possible to reduce the interferences between neighbouring coverage areas.

When the telecommunication device is in the relay operation mode, the telecommunication device may solve the problem of dead zones by relaying the signals transferred by an access node.

Furthermore, when the telecommunication device is in the relay operation mode for a terminal, it does not handle the terminal, avoiding then possible handover and extra signalling on the network side.

By switching a telecommunication device among plural telecommunication devices operating in a handling mode, interferences are reduced. As the switched telecommunication device execute a handover prior to the switch, the terminal previously handled by the switched telecommunication is still handled by a telecommunication device.

The coverage area of the switched telecommunication device and the coverage area of the telecommunication device which handles the terminal forms then a single coverage area of the telecommunication device which handles the terminal as the switched telecommunication device can no more be considered as a telecommunication device which may handle the terminal.

The single coverage area size is increased and interferences are reduced.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

In the wireless cellular telecommunication network, two access nodes AN1 and AN2 transfer signals in their respective cells C1 and C2.

The access nodes AN are also named base stations or nodes B or enhanced nodes B.

An access node AN1 or AN2 handles a terminal TE when the access node AN1 or AN2 has the information necessary for enabling the terminal TE to establish a communication with a remote device through the access node AN1 or AN2.

Each access node AN1 or AN2 transfers signals to a terminal TE through a downlink channel and receives signals transferred by the terminal TE through an uplink channel.

Figure 1A:
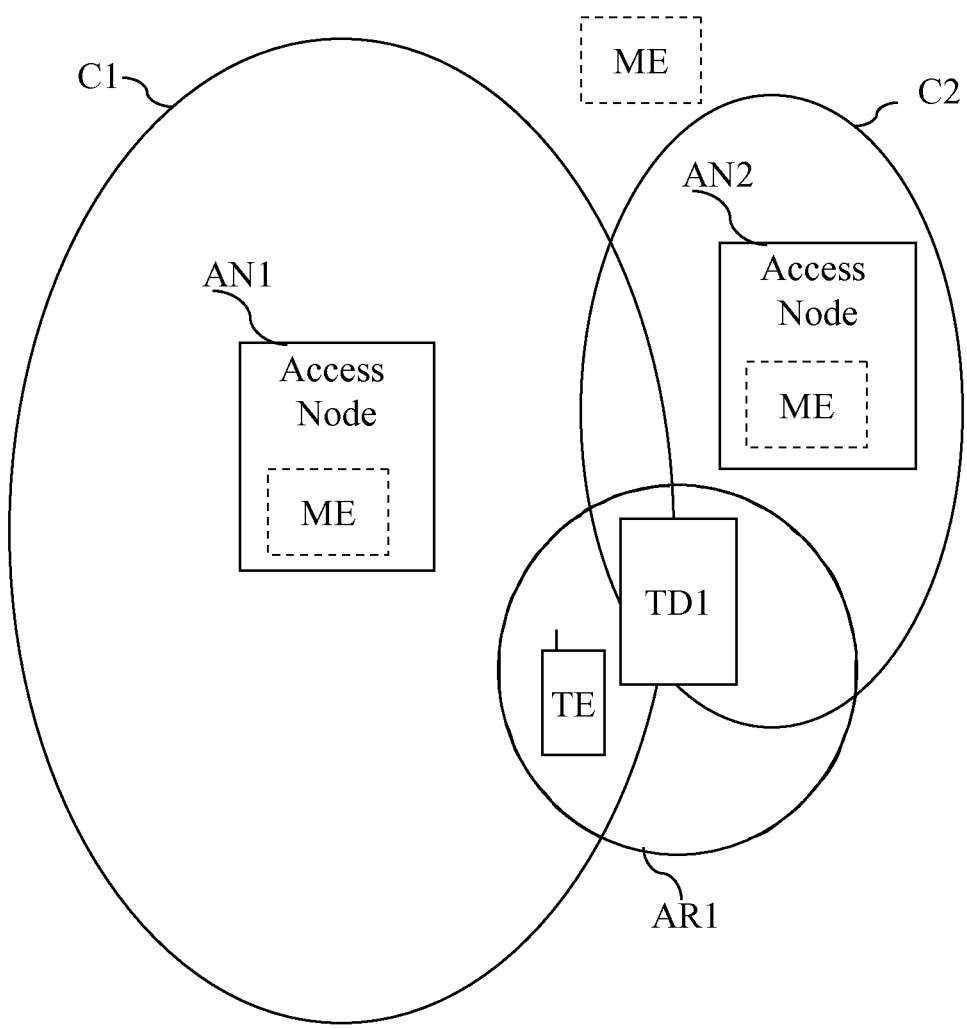
FIG. 1a represents the architecture of a wireless cellular telecommunication network in which the present invention is implemented.

In the FIG. 1a, one telecommunication device TD1 device is shown, the telecommunication device TD1 transfers signals in the area AR1. The telecommunication device TD1 acts in a first mode of operation like an access node, for example like a femto-base station and in a second mode of operation as a relay.

Each access node AN and telecommunication device TD are connected through a telecommunication network not shown in the FIG. 1 in order to form the wireless cellular telecommunication network. The telecommunication network is a dedicated wired network or a public network like a public switched network or an IP based network or a wireless network or an Asynchronous Transfer Mode network or a combination of above cited networks.

The first mode of operation of the telecommunication device TD consists of handling a terminal TE i.e. the telecommunication device TD1 handles a terminal TE when the telecommunication device TD1 has the information necessary for enabling the terminal TE to establish a communication with a remote device through the telecommunication device TD1.

The second mode of operation consists of relaying signals transferred between the terminal TE and the access node AN which handles the terminal TE.

When the telecommunication device TD1 acts as a relay, it receives signals transferred by the access node AN1 or AN2 which handles the terminal TE in the downlink channel and transfers these signals to the terminal TE through the downlink channel. The telecommunication device TD1 receives signals transferred by the terminal TE through the uplink channel and transfers these signals in the uplink channel to the access node AN1 or AN2 which handles the terminal TE.

It has to be noted here that in a variant, instead of receiving signals in the downlink channel and transferring signals in the uplink channel, the telecommunication device TD1 receives and transfers these signals through a non radio communication link between the access node AN1 or AN2 which handles the terminal TE and the telecommunication device TD1.

For example, the non radio communication link is established in a telecommunication network like a dedicated wired network or a public network like a public switched network or an IP based network or a wireless network or an Asynchronous Transfer Mode network or a combination of above cited networks.

It has to be noted here that the telecommunication device TD1 may be, for at least one terminal TE, in the handling mode of operation and may be, for at least one other terminal TE, in the relay mode of operation.

In the FIG. 1a, a management entity ME is shown. The management entity ME is included in at least one access node AN.

In variants, the management entity ME is included in the telecommunication device TD1 or is not included in access nodes AN and in the telecommunication device TD1.

In the FIG. 1a, only two access nodes AN1 and AN2 and one telecommunication device TD1 are shown for the sake of clarity but in practice the wireless cellular telecommunication network comprises a large number of access nodes AN and telecommunication devices TD.

It has to be noted here that, when a telecommunication device TD acts in the handling mode for each terminal TE located in its cell and does not act as a relay for any terminal TE, the telecommunication device TD is seen as a classical access node by the wireless cellular telecommunication network elements.

For example, the access node AN2 is a telecommunication device TD which acts in the handling mode for each terminal TE located in its cell and does not act as a relay for any terminal TE.

Figure 1B:
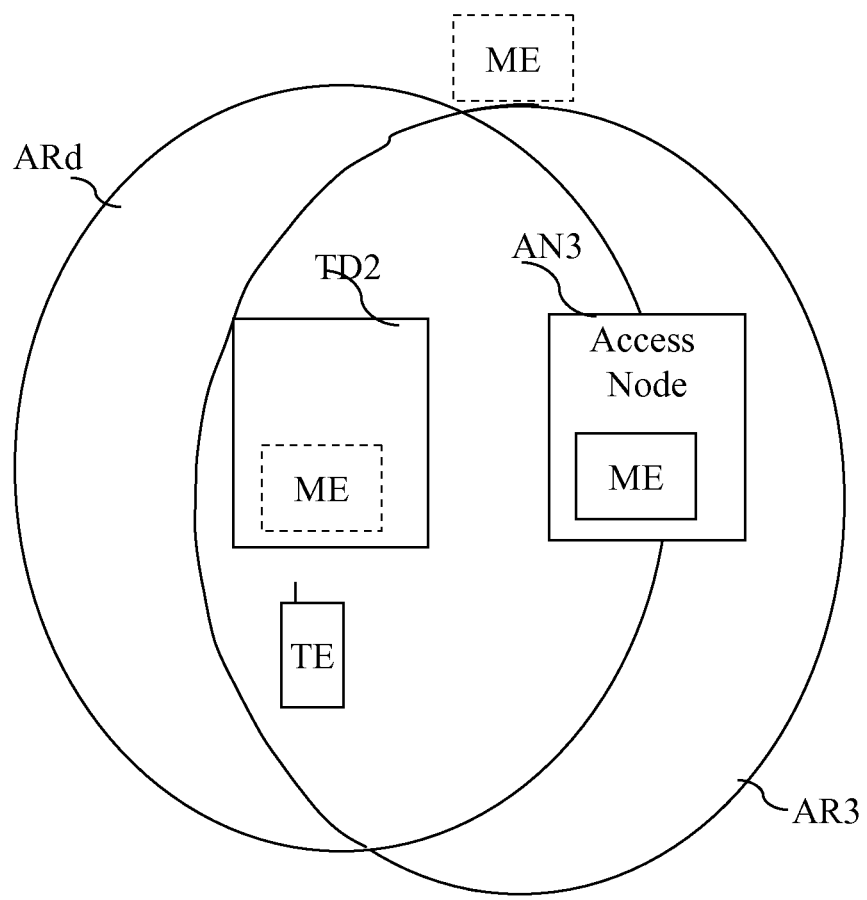
FIG. 1b is a diagram representing the architecture of at least one wireless local area telecommunication network in which the present invention is implemented.

FIG. 1b is a diagram representing the architecture of at least one wireless local area telecommunication network in which the present invention is implemented.

In the at least one wireless local area telecommunication network, an access node AN3 transfers signals in an area AR3.

The access node AN3 is for example an access node of a Local Area Network. The access node AN3 handles a terminal TE when the access node AN3 has the information necessary for enabling the terminal TE to use the local area network and for example to establish a communication with a remote device through the access node AN3.

The access node AN3 transfers signals to the terminal TE through a downlink channel and receives signals transferred by the terminal TE through an uplink channel.

In the FIG. 1b, one telecommunication device TD2 device is shown, the telecommunication device TD2 transfers signals in the area ARd. The telecommunication device TD2 acts in a first mode of operation like an access node of a local area network and in a second mode of operation as a relay.

The first mode of operation consists of handling a terminal TE. A telecommunication device TD2 handles a terminal TE when the telecommunication device TD2 has the information necessary for enabling the terminal TE to use the local area network in order to establish a communication with a remote device through the telecommunication device TD2.

When the telecommunication device TD2 handles a terminal TE, it transfers signals to the terminal TE through a downlink channel and receives signals transferred by the terminal TE through an uplink channel.

The second mode of operation consists of relaying signals transferred by the terminal TE and the access node AN, for example the access node AN3, which handles the terminal TE.

When the telecommunication device TD2 acts as a relay, it receives signals transferred by the access node AN3 which handles the terminal TE through the downlink channel and transfers these signals to the terminal TE through the downlink channel. The telecommunication device TD2 receives signals transferred by the terminal TE through the uplink channel and transfers these signals through the uplink channel to the access node AN3 which handles the terminal TE.

It has to be noted here that in a variant, the access node AN3 can also be a telecommunication device TD.

It has to be noted also here that in a variant, instead of receiving signals through the downlink channel and transferring signals through the uplink channel, the telecommunication device TD2 receives and transfers these signals through a non radio communication link between the access node AN3 which is handling the terminal TE and the telecommunication device TD2.

For example, the non radio communication link is established in a telecommunication network like a dedicated wired network or a public network like a public switched network or an IP based network or a wireless network or an Asynchronous Transfer Mode network or a combination of above cited networks.

It has to be noted here that the telecommunication device TD2 may be for at least one terminal TE in the handling terminal mode of operation and may be for at least one other terminal TE in the relay mode of operation.

In the example of the FIG. 1b, the areas AR3 and ARd overlap each other.

In the FIG. 1b, a management entity ME is shown. The management entity ME is included in at least one access node AN.

In variants, the management entity ME is included in at least one telecommunication device TD or is not included in access nodes AN nor in the telecommunication device TD.

In the FIG. 1b, only one access node AN3 and one telecommunication device TD2 are shown for the sake of clarity but in practice, a more important number of wireless local area networks, access nodes AN and telecommunication devices TD exist.

Figure 2:
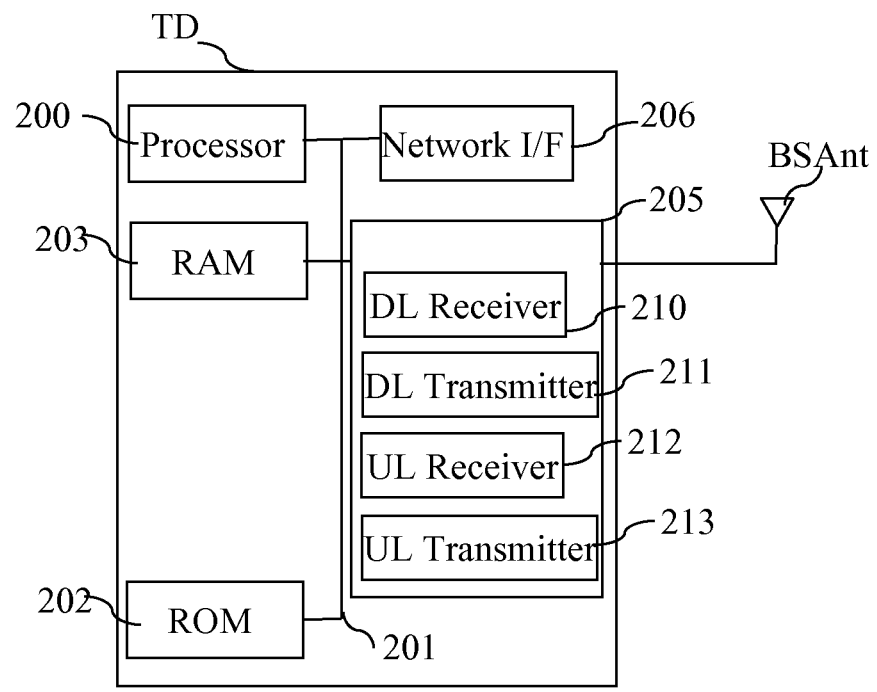
FIG. 2 is a diagram representing the architecture of a telecommunication device in which the present invention is implemented.

FIG. 2 is a diagram representing the architecture of a telecommunication device in which the present invention is implemented.

Figure 5:
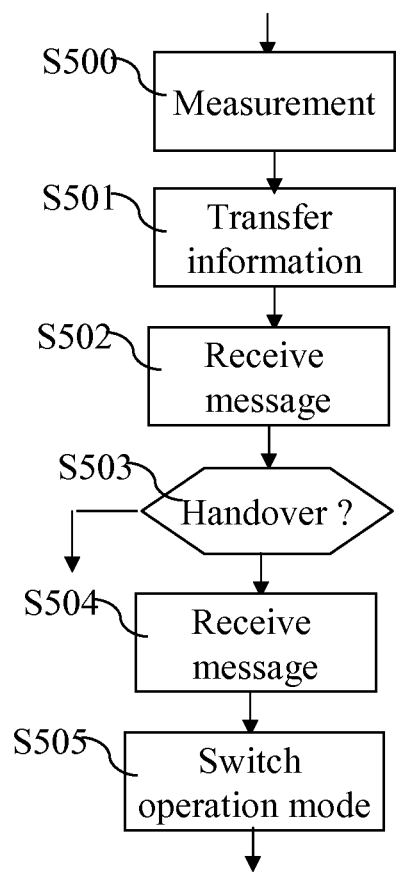
FIG. 5 is a an example of an algorithm executed by the telecommunication device according to the present invention.

The telecommunication device TE has, for example, an architecture based on components connected together by a bus 201 and a processor 200 controlled by the program as disclosed in the FIG. 5.

The bus 201 links the processor 200 to a read only memory ROM 202, a random access memory RAM 203, a wireless interface 205 and a network interface 206.

The memory 203 contains registers intended to receive variables and the instructions of the program as disclosed in the FIG. 5.

The memory 203 also contains information enabling the terminals handled by the telecommunication device TD to establish or receive a communication with a remote device. These information are for example the terminal identifier, the terminal capabilities, communication link Quality of service parameters, encryption parameters, or the security parameter.

The memory 203 also contains information enabling the terminal TD to operate in relay mode. These information are for example the list of terminal identifiers for which signals have to be relayed, the resource parameters of the relays, the type of relaying.

The processor 200 controls the operation of the network interface 206 and of the wireless interface 205.

The read only memory 202 contains instructions of the program as disclosed in the FIG. 5, which are transferred, when the telecommunication device TD is powered on to the random access memory 203.

The telecommunication device TD may be connected to a telecommunication network through the network interface 206. For example, the network interface 206 is a DSL (Digital Subscriber Line) modem, or an ISDN (Integrated Services Digital Network) interface, etc. Through such interface, the telecommunication device TD may transfer messages to the management entity ME and/or to the access nodes AN or receive message from the management entity ME and/or from the access nodes AN. In addition, the telecommunication device TD may receive through the interface 206, downlink signals from an access node AN and transfer uplink signals the telecommunication device TD has received through the uplink channel.

The wireless interface 205 enables the telecommunication device TD to transfer and/or receive signals or messages in its area AR.

The wireless interface 205 comprises a downlink reception module 210 which receives signals transferred by at least one access node AN, a downlink transmission module 211 which transfers signals to at least one terminal TE, an uplink reception module 212 which receives signals transferred by at least one terminal TE and an uplink transmission module 213 which transfers signals to at least one access node AN.

Figure 3:
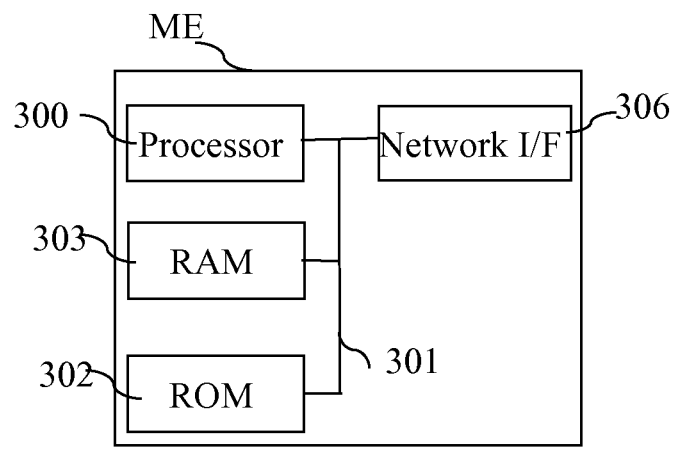
FIG. 3 is a diagram representing the architecture of a management entity in which the present invention is implemented.

FIG. 3 is a diagram representing the architecture of a management entity in which the present invention is implemented.

Figure 4:
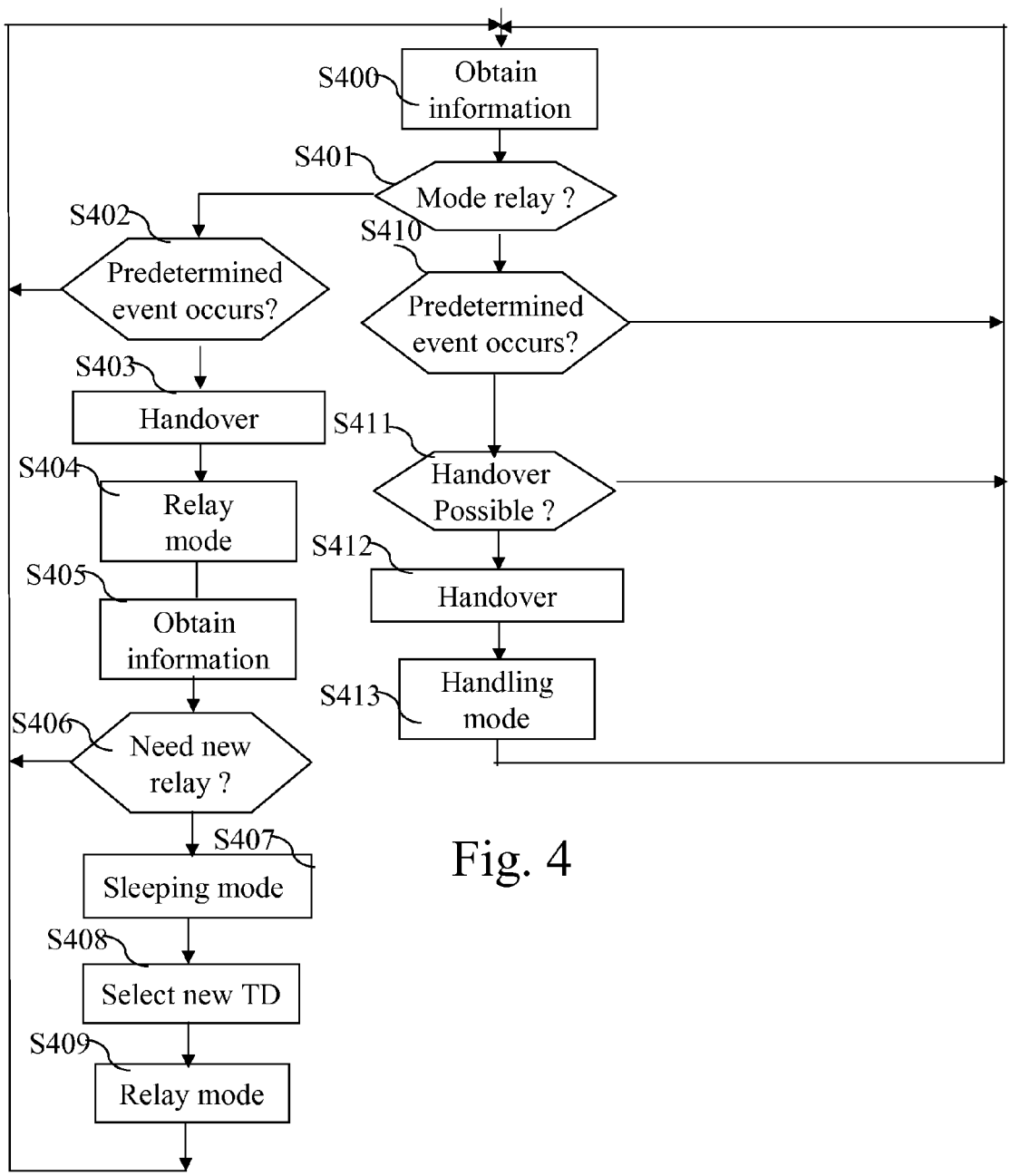
FIG. 4 is an example of an algorithm executed by the management entity according to the present invention.

The management entity ME has, for example, an architecture based on components connected together by a bus 301 and a processor 300 controlled by the program as disclosed in the FIG. 4.

The bus 301 links the processor 300 to a read only memory ROM 302, a random access memory RAM 303 and a network interface 306.

The memory 303 contains registers intended to receive variables and the instructions of the program related to the algorithm as disclosed in the FIG. 4.

The processor 300 controls the operation of the network interface 306.

The read only memory 302 contains instructions of the programs related to the algorithm as disclosed in the FIG. 4, which are transferred, when the management entity ME is powered on to the random access memory 303.

The management entity ME may be connected to a telecommunication network through the network interface 306. For example, the network interface 306 is a DSL (Digital Subscriber Line) modem, or an ISDN (Integrated Services Digital Network) interface, etc. Through such interface, the management entity ME may transfer messages to telecommunication devices TD and/or to the access nodes AN or receive messages from telecommunication devices TD and/or from access nodes AN.

It has to be noted here, when the management entity ME is included in a telecommunication device TD or is included in an access node AN, the processor 300, the memory 302, the random access memory RAM 303 and the network interface 306 may be the ones of the telecommunication device TD or the access node AN.

FIG. 4 is an example of an algorithm executed by the management entity according to the present invention.

More precisely, the present algorithm is executed by the processor 300 of the management entity ME for each terminal TE located in an area AR managed by a telecommunication device TD the management entity ME is in charge of.

At step S400, the processor 300 obtains information enabling the determination if a predetermined event occurs.

The information is the interference level between the telecommunication device TD and at least one access node AN and/or is a measurement on the signals transferred by the terminal TE in the uplink channel and/or is the location of the telecommunication device TD and/or is the location of the terminal TE and/or is the available resource of the telecommunication device TD in one or each operating mode and/or is a measurement on the signals received by the terminal TE and/or is an information linking the terminal TE and the telecommunication device TD and/or is a time duration.

The interference level is, for example, the level of interference generated by a neighbouring access node AN on signals transferred or received by the telecommunication device TD.

The level of interference may be measured by the telecommunication device TD or may be measured by the terminal TE and transferred to the telecommunication device TD.

According to the example of the FIG. 1b, when two areas AR overlap each other, the level of interferences may be important and may reduce the throughputs in both areas.

The measurement on the signals transferred by the terminal TE in the uplink channel may be executed by the access node AN which handles the terminal TE or by the telecommunication device TD when it is in any operation mode.

The location of the telecommunication device TD is transferred by the telecommunication device TD. The location of the telecommunication device may be provided by a Global Navigation Satellite System (GNSS) or a post address, or by measurements on signals transmitted by neighbouring access nodes AN.

The location of the terminal TE is transferred by the terminal TE and may be provided by a GNSS, or by measurements on signals transmitted by neighbouring access nodes AN.

The available resource of the telecommunication device TD in one or each operating mode is transferred by the telecommunication device TD.

Information linking the terminal TE and the telecommunication device TD may be an information indicating that the terminal TE is authorized to be handled by the telecommunication device TD. That information may be memorized by the management entity ME or transferred by the terminal TE or the telecommunication device TD.

The time duration is, for example, the time duration in which the telecommunication device TD is in the relay operation mode for the terminal TE. The time duration is transferred by the telecommunication device TD or managed by the management entity ME.

At next step S401, the processor 300 checks if the telecommunication device TD operates in the relay operation mode or in the terminal handling operation mode for the terminal TE.

If the telecommunication device TD operates in a relay operation mode, the processor 300 moves to step S410. If the telecommunication device TD operates in the terminal handling mode, the processor 300 moves to step S402.

At step S402, the processor 300 checks if a predetermined event occurs.

The predetermined event occurs when the interference level between the telecommunication device TD and at least one access node AN is upper than a predetermined threshold and/or when the measurement on the signals transferred by the terminal TE in the uplink channel are lower than a predetermined value and/or when the terminal TE becomes far from the telecommunication device TD and/or the available resource of the telecommunication device TD in the handling operating mode is lower than a predetermined threshold and/or when measurements on the signals received by the terminal TE are lower than a threshold.

It has to be noted here that in a variant, the processor 300 may be notified by the telecommunication device TD that the predetermined event occurs. In that variant, the telecommunication device TD checks if the interference level between the telecommunication device TD and at least one access node AN is upper than a predetermined threshold and/or checks if the measurements on the signals transferred by the terminal TE in the uplink channel are lower than a predetermined value and/or checks if the terminal TE becomes far from the telecommunication device TD and/or checks if the available resource of the telecommunication device TD in the handling operating mode is lower than a predetermined threshold and/or checks if measurements on the signals received by the terminal TE are lower than a threshold.

If the predetermined event occurs, the processor 300 moves to step S403. Otherwise, the processor 300 returns to step S400.

At step S403, the processor 300 decides that a handover of the terminal TE has to be conducted from the telecommunication device TD and the access node AN and commands the transfer of a message to the telecommunication device TD and the access node AN requesting them to proceed to the handover.

At next step S404, the processor 300 decides that the telecommunication device TD has to switch in the relay mode of operation and commands the transfer of a message to the telecommunication device TD requesting it to switch in the relay operation mode. The processor 300 memorizes an information representative of the operation mode in which the telecommunication device TD is.

At next step S405, the processor 300 obtains information as the one already disclosed at step S400.

At next step S406, the processor 300 checks if another telecommunication device TD needs to be switched in the relay mode of operation for the terminal TE.

Another telecommunication device TD needs to be switched in a relay mode for the terminal TE when the interference level is upper than a predetermined threshold and/or when the measurements on the signals transferred by the terminal TE in the uplink channel are lower than a predetermined value and/or when the terminal TE becomes far from the telecommunication device TD and/or when the available resource of the telecommunication device TD in the relay operating mode is lower than a predetermined threshold and/or when measurements on the signals received by the terminal TE are lower than a threshold or when the telecommunication device may be switched off soon.

If another telecommunication device TD needs to be switched in a relay mode for the terminal TE, the processor 300 moves to step S407. Otherwise, the processor 300 returns to step S400.

At step S407, the processor 300 decides that the telecommunication device TD has to switch in an operating mode wherein the telecommunication device stops to transfer signals related to the terminal TE and commands the transfer of a message to the telecommunication device TD requesting it to switch in that operating mode.

In a variant, the processor 300 moves directly from step S406 to S408.

In another variant, the processor 300, instead of executing the step S407, decides, according to previous memorized switches of operating modes, that the telecommunication device TD has to switch in the operating mode in which the telecommunication device relays signals transferred between the terminal and the access node or to switch in an operating mode wherein the telecommunication device stops to transfer signals related to the terminal TE. A message informing the telecommunication device TD about the decision is transferred.

At next step S408, the processor 300 selects another telecommunication device TD which has to switch in the relay mode of operation for the terminal TE.

The other telecommunication device TD is selected for example considering the location of the terminal TE and/or randomly in a group of telecommunication devices TD which are expected to be close from the terminal TE and/or from measurements reported by the terminal TE on signals transmitted from neighbouring telecommunication devices and/or from information obtained from telecommunication devices TD at step S400.

At step S409, the processor 300 requests the new selected telecommunication device TD to switch to the relay operating mode and memorizes an information representative of the operation mode of the telecommunication device TD.

After that, the processor 300 returns to step S400.

At step S410, the processor 300 checks if a predetermined event occurs.

The predetermined event occurs when the measurements on the signals transferred by the terminal TE in the uplink channel and measured by the telecommunication device TD are upper than a predetermined value and/or when the terminal TE becomes closer to the telecommunication device TD and/or when the available resource of the telecommunication device TD in the handling operating mode is upper than a predetermined threshold and/or when the available resource of the telecommunication device TD in the relay operating mode is lower than a predetermined threshold and/or when measurements on the signals received by the terminal TE are upper than a threshold and/or when the time duration in which the telecommunication device acts as a relay is upper than a threshold.

If the predetermined event occurs, the processor 300 moves to step S411. Otherwise, the processor 300 returns to step S400.

At step S411, the processor 300 checks if a handover is possible. For example, the processor 300 requests the telecommunication device TD if it accepts to handle the terminal TE. Such step is executed when no information linking the terminal TE and the telecommunication device have been obtained at step S400.

If the handover is possible, the processor 300 moves to step S412.

Otherwise, the processor 300 returns to step S400.

At step S412, the processor 300 decides that a handover of the terminal TE has to be conducted from the access node AN to the telecommunication device TD and commands the transfer of a message to the telecommunication device TD and the access node AN requesting them to proceed to the handover. Alternatively, the processor 300 commands the transfer of a message to the access node AN solely requesting it to proceed to the handover, the telecommunication device TD being ready to execute handover procedures.

At next step S413, the processor 300 decides that the telecommunication device TD has to switch in the handling operating mode and commands the transfer of a message to the telecommunication device TD requesting it to switch in the handling mode and memorizes an information representative of the operation mode of the telecommunication device TD.

After that, the processor 300 returns to step S400.

FIG. 5 is an example of an algorithm executed by the telecommunication device according to the present invention.

More precisely, the present algorithm is executed by the processor 200 of the telecommunication device TD.

At step S500, the processor 200 commands the wireless interface 205 to proceed to at least one measurement.

The at least one measurement is the level of interference generated by a neighbouring access node AN on signals transferred and/or received by the telecommunication device TD and/or is the available resource of the telecommunication device TD in one or each operating mode and/or is a measurement on the signals transferred by neighbouring terminals TE, and/or or is the location of the telecommunication device TD.

At next step S501, the processor 200 commands the transfer of information to the management entity ME.

Information is derived from the at least one measurement or is derived from the at least one measurement and the location of the terminal TE and/or from the information linking the terminal TE and the telecommunication device TD and/or from the time duration.

It has to be noted here that in a variant, the processor 200 determines if the predetermined event occurs and notifies that the event occurs to the management entity ME. In that variant the processor 200 checks if the interference level between the telecommunication device TD and at least one access node AN is upper than a predetermined threshold and/or checks if the measurements on the signals transferred by the terminal TE in the uplink channel are lower than a predetermined value and/or checks if the terminal TE becomes far from the telecommunication device TD and/or checks if the available resource of the telecommunication device TD in the handling operating mode is lower than a predetermined threshold and/or checks if measurements on the signals received by the terminal TE are lower than a threshold.

At next step S502, the processor 200 receives a message from the management entity ME through the network interface 206 or the wireless interface 205.

At next step S503, the processor 200 checks if the received message is representative of a command requesting it has to proceed to a handover of the terminal TE with an access node AN. If the received message is representative of a command requesting to proceed to a handover, the processor 200 moves to step S504. Otherwise, the processor 200 returns to step S500.

At next step S504, the processor 200 receives a message from the management entity ME through the network interface 206 or the wireless interface 205.

The message indicates the mode of operation of the telecommunication device TD.

At next step S505, the processor 200 commands the wireless interface 205 to switch in a mode of operation which is different from the operating mode in which the telecommunication device TD is operating.

When the telecommunication switch from the operating mode in which the telecommunication device handles the terminal moves to the relay mode, the telecommunication device may decide itself, for example, according to previous memorized switches of operating modes, if the telecommunication device TD has to switch in the operating mode in which the telecommunication device relays signals transferred between the terminal and the access node or if the telecommunication device TD has to switch in an operating mode wherein the telecommunication device stops to transfer signals related to the terminal TE.

After that, the processor 300 returns to step S500.

Naturally, many modifications can be made to the embodiments of the invention described above without departing from the scope of the present invention.

The invention claimed is:

1. A method for deciding if a telecommunication device has to be switched to an operating mode which is different from a current operating mode in which the telecommunication device is operating, the telecommunication device transferring radio signals to a terminal of a wireless telecommunication network, wherein in a second operating mode, the telecommunication device does not handle the mobile device and relays signals transferred between the terminal and an access node which handles the terminal, and in a first operating mode, the telecommunication device handles the terminal, the method comprising:

determining, from obtained information, if a predetermined event occurs, and when the predetermined event occurs:
deciding that a handover of the terminal has to be conducted between the access node and the telecommunication device; and
responsive to said handover deciding, deciding that the telecommunication device has to switch from the current operating mode in which the telecommunication device is operating, which is one of the second operating mode where the telecommunication device does not handle the mobile device and relays signals transferred between the terminal and the access node which handles the terminal and the first operating mode where the telecommunication device handles the terminal, to a different operating mode, which is the other of the first operating mode and the second operating mode.

2. The method according to claim 1, wherein the current operating mode is the second operating mode in which the telecommunication device does not handle the mobile device and relays signals transferred between the terminal and the access node.

3. The method according to claim 1, wherein the current operating mode is the first operating mode in which the telecommunication device handles the terminal.

4. The method according to claim 3, further comprising:
obtaining other information; and
deciding if another telecommunication device has to switch to the second operating mode in which the telecommunication device does not handle the mobile device and relays signals transferred between the terminal and the access node according to the other information.

5. The method according to claim 4, further comprising deciding that the telecommunication device has to switch to a third operating mode in which the telecommunication device stops transferring signals to the terminal.

6. The method according to claim 4, further comprising deciding, according to previous switches, operating modes that the telecommunication device has to switch in the second operating mode in which the telecommunication device does not handle the mobile device and relays signals transferred between the terminal and the access node.

7. The method according to claim 6, wherein said deciding, according to previous switches of operating modes, is executed by a management entity or by the telecommunication device.

8. The method according to claim 3, further comprising, executing, prior to said deciding that the handover of the terminal has to be conducted between the access node and the telecommunication device, obtaining information from the telecommunication device indicating whether the telecommunication device can handle the terminal.

9. The method according to claim 1, wherein the obtained information used for determining if the predetermined event occurs is one or more of an interference level measured by the telecommunication device, a measurement on signals transferred by the terminal, a location of the telecommunication device, a location of the terminal, available resource of the telecommunication in one or each operating mode, measurement on signals received by the terminal, information linking the terminal and the telecommunication device, and a time duration.

10. The method according to claim 1, wherein the method is executed by a management entity, the management entity being included in the access node, or in each telecommunication device, or is not included in the access node nor in each telecommunication device.

11. The method according to claim 1, wherein the wireless telecommunication network is a wireless cellular telecommunication network.

12. A non-transitory computer readable medium including computer executable instructions or portions of code for implementing the method according to claim 1, when the computer executable instructions of portions of code are executed on a programmable device.

13. The method according to claim 1, wherein the telecommunication device handles the terminal by transferring signals to the terminal through a downlink channel and receives signals transferred by the terminal through an uplink channel.

14. The method according to claim 1, wherein the telecommunication device determines if the predetermined event occurs.

15. The method according to claim 1, wherein the telecommunication device notifies a management entity associated with the access node that the predetermined event has occurred.

16. The method according to claim 1, wherein the handover is performed prior to the mode switch from the current operating mode to the different operating mode.

17. A management entity which decides if a telecommunication device has to be switched to an operating mode which is different from a current operating mode in which the telecommunication is operating, the telecommunication device transferring radio signals to a mobile terminal of a wireless telecommunication network, wherein the telecommunication device includes circuitry that relays signals transferred between the mobile terminal and an access node which handles the mobile terminal, and circuitry that handles the mobile terminal, wherein in a second operating mode, the telecommunication device does not handle the mobile device and relays signals transferred between the mobile terminal and the access node which handles the mobile terminal, and in a first operating mode, the telecommunication device handles the mobile terminal, the management entity comprising:
  circuitry configured to determine, from obtained information when a predetermined event occurs;
  circuitry configured to decide that a handover of the mobile terminal has to be conducted between the access node and the telecommunication device; and
  circuitry configured to decide that the telecommunication device has to switch from the current operating mode in which the telecommunication device is operating, which is one of the second operating mode where the telecommunication device does not handle the mobile device and relays signals transferred between the terminal and the access node which handles the terminal and the first operating mode, to a different operating mode, which is the other of the first operating mode and the second operating mode, in response to a decision that the handover of the mobile terminal has to be conducted.

18. A method for switching a telecommunication device to an operating mode which is different from a current operating mode in which the telecommunication device is operating, the telecommunication device transferring radio signals to a terminal of a wireless telecommunication network, wherein in a second operating mode, the telecommunication device does not handle the mobile device and relays signals transferred between the terminal and an access node which handles the terminal, and in a first operating mode, the telecommunication device handles the terminal, the method, executed by the telecommunication device, comprising:
  transferring information representative of measurements to a management entity;
  receiving a message representative of a request to execute a handover of the terminal between the access node and the telecommunication device;
  executing the handover; and
  after said executing the handover, switching the current operating mode of the telecommunication device, which is one of the second operating mode where the telecommunication device does not handle the mobile device and relays signals transferred between the terminal and the access node which handles the terminal and the first operating mode where the telecommunication device handles the terminal, to a different operating mode, which is the other of the first operating mode and the second operating mode.

19. A telecommunication device which transfers radio signals to a mobile terminal of a wireless telecommunication network, the telecommunication device configured to operate in two operation modes, the telecommunication device comprising:
  circuitry that relays signals transferred between the mobile terminal and an access node which handles the mobile terminal;
  circuitry that handles the mobile terminal, wherein in a second operating mode, the telecommunication device does not handle the mobile device and relays signals transferred between the mobile terminal and the access node which handles the mobile terminal, and in a first operating mode, the telecommunication device handles the mobile terminal;
  circuitry that transfers information representative of measurements to a management entity;
  circuitry that receives a message representative of a request for executing a handover of the mobile terminal between the access node and the telecommunication device;
  circuitry that executes the handover; and
  circuitry that switches from the current operating mode in which the telecommunication device is operating, which is one of the second operating mode where the telecommunication device does not handle the mobile device and relays signals transferred between the terminal and the access node which handles the terminal and the first operating mode where the telecommunication device handles the terminal, to a different operating mode, which is the other of the first operating mode and the second operating mode, after the handover.

* * * * *